Oct. 2, 1962
A. G. TALBERT
3,056,509
MOBILE CRANE MOUNTING
Filed Oct. 19, 1953
3 Sheets-Sheet 1
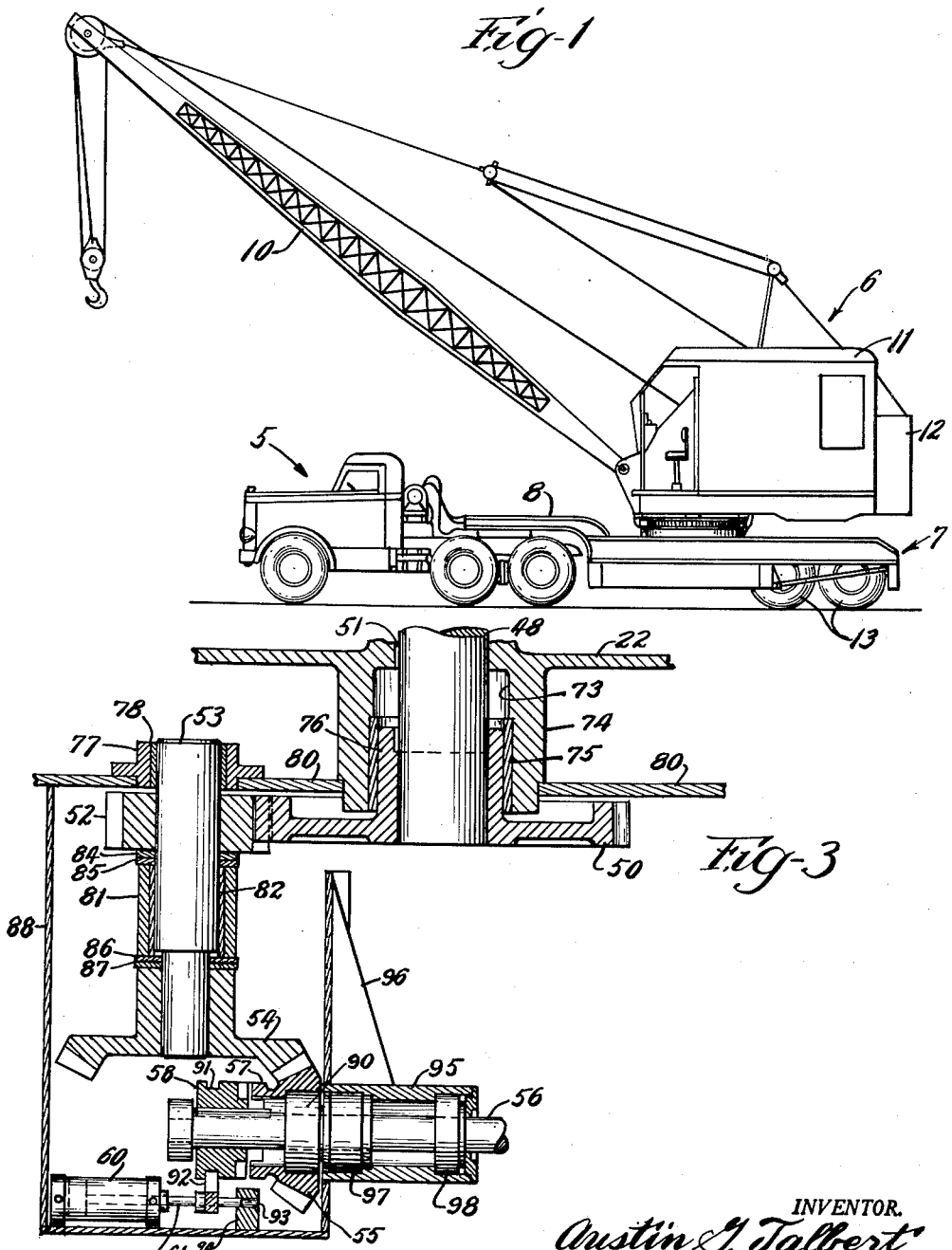
INVENTOR.
Austin G. Talbert
BY
Cromwell, Greist & Warden
Attys.

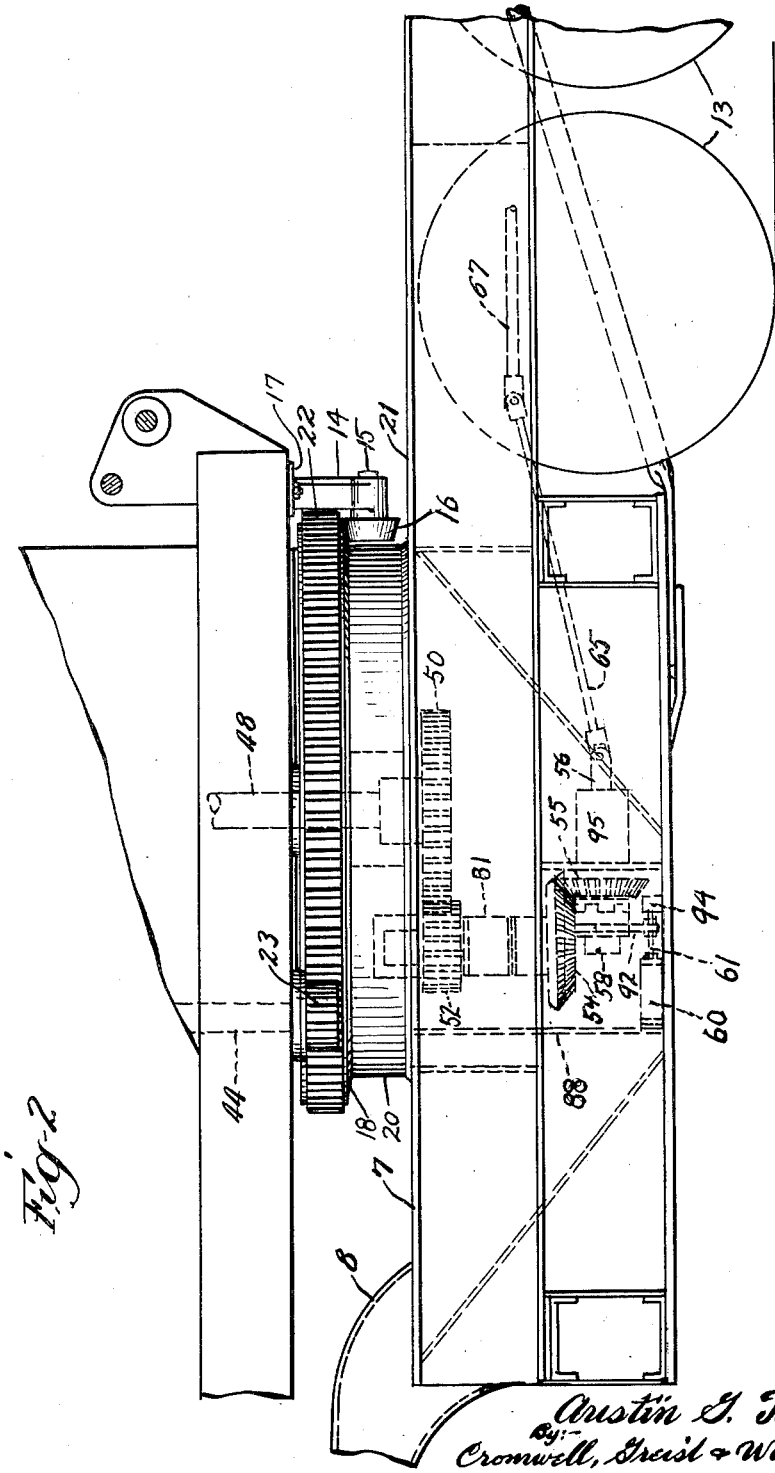

Oct. 2, 1962     A. G. TALBERT     3,056,509
MOBILE CRANE MOUNTING
Filed Oct. 19, 1953     3 Sheets-Sheet 3
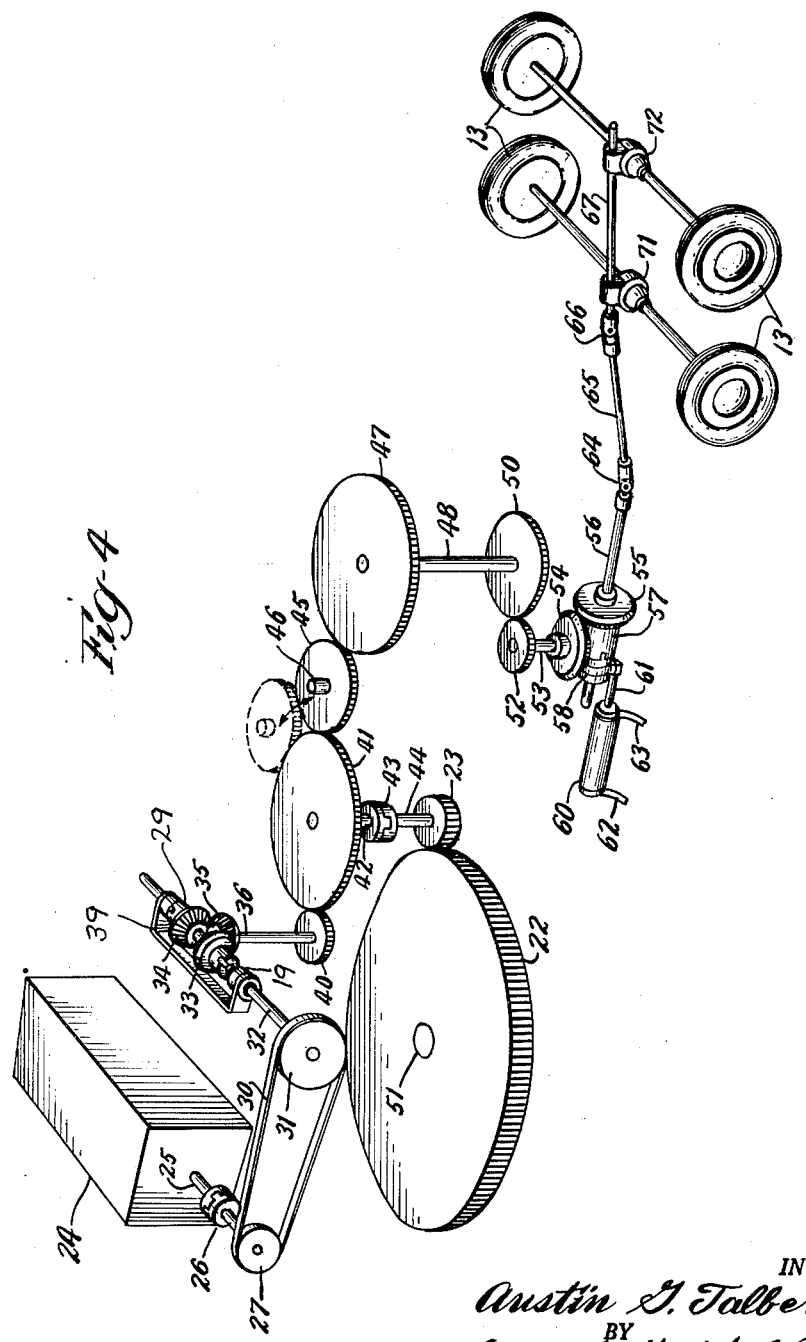
INVENTOR.
Austin G. Talbert
BY
Cromwell, Greist & Warden
Attys.

3,056,509
MOBILE CRANE MOUNTING
Austin G. Talbert, Lyons, Ill., assignor to Talbert Construction Equipment Company, Lyons, Ill., a corporation of Illinois
Filed Oct. 19, 1953, Ser. No. 386,737
2 Claims. (Cl. 212—38)

This invention relates, generally, to innovations and improvements in mobile crane units of the type wherein a crane mounted on a semi-trailer is normally hauled from place to place by means of a truck tractor of the type used to haul truck trailers on the highways.

More particularly, the invention relates to such a mobile crane unit wherein disconnectable power-transmitting means are provided for driving the wheels of the semi-trailer from the independent power plant of the mobile crane so that in places where movement is extremely rough and difficult, the unit can be moved through the combined power and traction of the truck tractor unit and of the semi-trailer powered from the crane power plant.

Mobile crane units are known of the type wherein the crane is mounted on a semi-trailer and the unit is transported by means of a truck tractor attached to the front end of the trailer. Such units have the advantage of high mobility and can be transported long distances at high speed. However, such units are often unable to negotiate and move over extremely difficult terrain or over places where the traction is poor such as in deep mud or snow.

Mobile cranes of another type are also known wherein the crane is mounted on a chassis having its own front and back support wheels, with the rear wheel being driven by the power plant for the crane and with the front wheels being steered from the crane house. While such self-propelled units avoid the expense of a separate truck tractor, they can travel only at relatively slow speeds on the highway, and this is a serious drawback.

The present invention for the first time provides a mobile crane unit of the type having a truck tractor so that it is capable of high mobility on the highway and at the same time makes provision for use of the independent power plant of the crane to drive the wheels of the semi-trailer so that when the going is extremely rough, the combined power of the truck tractor and of the crane power plant and the combined traction of the tractor and trailer components permit the unit to negotiate places which could not be negotiated by mobile crane units of the types previously known.

The object of this invention, generally stated, is the provision of a mobile crane unit having a truck tractor which is used for normal transport of the unit across country at relatively high speed, with the crane being mounted on a semi-trailer which is towed by the truck tractor and with the power plant of the crane interconnected for driving relationship with the support wheels of the trailer so that when the going is extremely rough, the unit can be moved through the combined power and traction of the truck tractor and of the trailer using the power plant of the crane.

An important object of the invention is economical and rugged slow speed drive connection between the power plant of the crane mounted on a semi-trailer and the trailer wheels, which drive connection will not ordinarily be transmitting power either during operation of the crane or during cross-country movement of the crane, but which can be connected in power-transmitting relationship when there is a need for extra power and traction to move the crane unit.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

FIG. 1 is a side elevational view of a mobile crane unit which embodies the present invention;

FIG. 2 is an enlarged fragmentary side elevational view of the crane mount of FIG. 1 showing a portion of the drive or power-transmitting connection between the power plant of the crane and the rear wheels of the semi-trailer;

FIG. 3 is a detail sectional view on enlarged scale of a portion of the power-transmitting mechanism shown in FIG. 2; and FIG. 4 is a schematic view showing the power-transmitting connections between the power plant of the crane and the mechanism for swinging the crane house, as well as the drive connection to the wheels of the bogie unit which supports the semi-trailer on which the crane is mounted.

Referring to FIG. 1 of the drawings, the reference numeral 5 designates, generally, a truck tractor of known make which is utilized for transporting or moving the mobile crane unit which also includes a crane 6 mounted on a semi-trailer 7. The front end of the semi-trailer 7 is hitched to the fifth-wheel on the rear of the truck tractor 5 by means of a gooseneck 8 which permits the truck tractor 5 to be detached and used for other jobs as required, during which time the front end of the semi-trailer 7 will be blocked up.

The crane 6 is provided with the conventional boom 10 and associated rigging projecting from a crane house 11. The crane house 11 is mounted on the main platform or deck of the semi-trailer 7 so that it may be swung through 360 degrees to any desired position. A counterweight 12 is attached to the rear of the crane house 11. The crane 6 is provided with its own power plant, which may be either a gasoline or diesel internal combustion engine, and this power plant serves not only to operate the crane itself but also to drive the bogie wheels 13—13 of the semi-trailer 7 when the going is extremely difficult and the truck tractor 5 alone cannot deliver sufficient motive power and traction.

The crane house 11 is suitably connected to the trailer 7 in known manner by means of a plurality of hook swing rollers each of which comprises a bracket 14 supporting a stub shaft 15 on the inner end of which is mounted a beveled roller 16.

Each fixture or bracket 14 is attached to the underside of the crane house 12 by means of a plurality of bolts extending through a top plate 17. The rollers 16 press up against a roll track 18 formed on a bull gear casting 20 which is secured to the deck 21 of the semi-trailer 7. While only one bracket 14 and one roller 16 are shown, it will be understood that there are four or more such rollers spaced around the track 18 in known manner.

A bull gear 22 is integrally formed on top of the casting 20. The crane house 11 is swung on the semi-trailer by means of a power-driven swing pinion gear 23 which meshes with the stationary bull gear 22.

Reference may now be had to FIG. 4 of the drawings for a description of the driving connections between the power plant or engine 24 of the crane and the swing pinion gear 23, on the one hand, and the bogie wheels 13—13 on the other hand. The engine 24 has a drive shaft 25 provided with a clutch 26 which permits the engine to be started without any drag on it. A drive sprocket 27 is mounted on the outer end of the shaft 25. A chain 30 runs over the drive sprocket or power take-off sprocket 27 and over a sprocket 31 mounted on a shaft 32 which carries a pair of beveled gears 33 and 34 which are free to rotate on the shaft 32 and maintained in mesh with a beveled gear 35. A slider device 39 is provided with clutch sections 19 and 29 which are splined to the shaft 32 so as to turn therewith. By shifting the slider 39 one way or the other, one of the clutch sections 19 or 29 engages the adjacent gear 33 or 34 and causes it to turn and thereby drive the bevel gear 35. The beveled gear 35 is mounted on the upper end of a shaft 36 having a pinion gear 40 fastened to the bottom end thereof. The pinion gear 40 meshes with and drives a larger gear 41 mounted on the upper end of a shaft 42 which is connected with one section of a clutch 43 with the other section of the clutch carrying a shaft section 44 on the bottom end of which the swing pinion gear 23 is mounted so as to mesh with and travel around the bull gear 22.

In order to drive the bogie wheels 13—13 from the crane engine 24 and take maximum advantage of the above described driving connection between the engine and the swing pinion gear 23, an idler gear 45 is provided which is in constant mesh with gear 41 and swingable on a shaft 46 so as to be moved from its idling position shown in broken line into driving engagement with a gear wheel 47 as shown in solid line. When engaged, the gear 45 transmits power from the gear 41 to the gear 47 mounted on a shaft 48 on the bottom of which is provided a smaller gear 50. As will be pointed out hereinafter in connection with FIGS. 2 and 3, in the actual unit the shaft 48 extends through a central opening 51 in the bull gear 22.

The gear 50 meshes with and drives a gear 52 provided on the upper end of a shaft 53 on the lower end of which is carried a beveled gear 54. The beveled gear 54 meshes with a beveled gear 55 which is free to rotate on a drive shaft 56. The beveled gear 55 has integrally attached thereto a clutch section 57 which is adapted to be engaged with a mating clutch section 58 slidably mounted on the drive shaft 56. The clutch section 58 is adapted to be shifted into and out of engagement with the clutch section 57 by means of a double-acting pneumatic or hydraulic cylinder unit 60 having a projecting connecting rod 61 attached to the clutch section 58. The cylinder 60 is remotely controlled in known manner from the crane house 12 through suitable valve controls of known type (not shown) which alternately deliver pressure to the opposite ends of the cylinder 60 through hose connections indicated at 62 and 63. It will be understood that when pressure is being delivered to one end of the cylinder 60, the other end is vented.

The clutch shaft 58 is splined to the drive shaft 56 so as to rotate therewith at all times. It will be seen that when the clutch shafts 57 and 58 are engaged and the gear train 41—45—47—50—52—54—55 is engaged, the drive shaft 56 will be driven in one direction or another depending upon the position of the shifter 39.

The rear end of the drive shaft 56 is connected by means of a universal joint 64 to an inclined propellor shaft 65 which is in turn connected by means of another universal joint 66 to a rear drive shaft 67. The drive shaft 67 is provided with suitable gears so as to drive the differentials indicated generally at 71 and 72 of known type. The axles are driven by the differentials in known manner so as to drive the wheels 13—13.

The details of the driving connection between the gear wheel 50 and the drive shaft 56 are shown in greater detail in FIGS. 2 and 3. As there shown, the shaft 48 supporting the gear 50 passes down through central opening 51 in the top of the bull gear 22. The bottom of a hub 74 provides an opening 73 for receiving a sleeve-type bearing 75 in which turns an integral sleeve portion 76 of the gear 50.

The top end of the shaft 53 is mounted for rotation in a bearing 77 having a sleeve insert 78. The bearing 77 rests on a plate 80 of the forming part deck 21 of the semi-trailer 7. The gear 52 which meshes with the gear 50 is supported on the shaft 53 beneath the bearing 77 and above a bearing 81 of known type. The bearing 81 has a sleeve insert 82 in which the shaft 53 turns and flat-bearing spring members 84, 85 at the top, and 86, 87 at the bottom.

The beveled gear 54 is mounted on the bottom end of the shaft 53 so as to mesh with the beveled gear 55 mounted on the drive shaft 56. It will be noted that the beveled gears 54, 55 and associated mechanism are mounted within a casing or housing 88 which is suitably secured underneath the trailer deck 21.

The beveled gear 55 turns on a support-bearing shoulder 90 which is mounted on the shaft 56 inwardly of the housing 80, thereby preventing shifting of this beveled gear 55 away from the beveled gear 54. The clutch section 57 is integrally formed on the inside of the beveled gear 55 so as to be engaged by the shiftable clutch section 58. The shiftable clutch shaft 58 is provided with a groove 91, the lower side of which is engaged by a shifting fork or arm 92 which is mounted on the connecting rod 61. The outer end of the connecting rod 61 slides in an opening 93 provided therefor in a support 94 which rises from the bottom of the housing 88.

The drive shaft 56 is supported in a bearing housing 95 which is attached to the outside of the housing 88 and secured thereto by means of a gusset plate 96. The shaft 56 turns in two such roller bearings indicated at 97 and 98 which are located in opposite ends of the housing 95.

The use and operation of the embodiment of the invention described is as follows: Normally, the mobile crane unit is hauled from one job to another, and moved about on each job as required, solely by the truck tractor 5. During such normal use, the gear 45 is swung out of contact with the gear 47, and the double-acting cylinder 60 is so controlled as to retract the connecting rod 61, thereby disconnecting the clutch section 58 from the clutch section 57. It is important that both the gear 45 be disconnected as well as the clutch 57—58 so as to protect and save wear on the power-transmitting gear train 47—50—52—54—55.

When the mobile crane unit is hauled over highways at relatively high speeds, the drive shaft 67 and the propeller shafts 56 and 65 will be driven at relatively high speeds through the differentials 71 and 72. During such cross-country transport the drive shaft 56 will be rotated at a speed far in excess of the speed with which it is normally driven when it is powered from the crane engine 24. The gear train 47—50—52—54—55 is not designed to be driven at the high speeds that would be involved if the gear train were to be driven with the drive shaft 56 during cross-country transport. If this gear train were driven, it would have to be of an expensive design in order to run at such high speeds during travel at high speed and at such low speeds when power is transmitted to the gear train from the crane engine 24. Therefore, the clutch 57—58 serves to protect the gear train from such excessive speeds and excessive wear which would be attendant thereto.

However, the clutch 57—58 is not alone sufficient for protecting this gear train 47 to 55 and for that reason the gear 45 is made so that it can be swung into and out of mesh with the gear 47. This permits the gear train to be disconnected when the crane is being used and the pinion gear 23 is being driven to swing the crane around on its mount.

When a condition is encountered in which the truck tractor 5 cannot alone provide sufficient power and traction to move the mobile crane unit, then the crane engine 24 is started and the clutches 26 and 57—58 are engaged, and the gear 45 is swung into mesh with the gear 47. At the same time, the clutch 43 is disconnected. The slider or shifter 39 is moved so as to drive the bogie wheels in the desired direction. The unit comprising the slider 39, the bevel gears 33 and 34, and the bevel gear 35 serves as a reversing clutch. It will be seen that the bogey wheels 13 are now placed in power-transmitting relationship with the crane engine or power plant 24 and the entire mobile crane unit can be moved through the combined traction and power of the truck tractor 5 and the crane itself.

When the requirement for the power from the crane has ceased, then the clutches 57—58 and the gear wheel 45 will be disconnected for the reasons pointed out above.

It will be appreciated that the crane itself is swung and operated in the usual manner.

Since certain changes in details and design may be made in the embodiment of the invention described above and shown in the accompanying drawings, it is intended that that embodiment be interpreted as illustrative and not in a limiting sense with the understanding that certain changes in detail and design may be made without departing from the spirit and scope of the invention.

What is claimed as new is:

1. In a mobile crane unit comprising a truck tractor, a semi-trailer hitched thereto, and a crane mounted on said semi-trailer having its own engine, said semi-trailer having a stationary bull gear on which said crane is mounted and which meshes with a swing pinion gear driven by the crane engine through a gear train which includes a gear wheel mounted on the upper end of the shaft carrying said swing pinion gear and a reversing clutch between said crane power plant and said gear wheel, the improvement which comprises a clutch in said shaft on which said gear wheel and swing pinion are mounted and power-transmitting means interconnecting said gear wheel with the wheels of said trailer comprising, a vertical shaft passing down through the center of said bull gear, a gear on the upper end of said vertical shaft, means for disconnectably driving the last mentioned gear from said gear wheel, a drive shaft, a bevel gear rotatably mounted on said drive shaft, gear means drivably interconnecting said bevel gear with said vertical shaft, clutch means on said drive shaft for interconnecting said bevel gear with said drive shaft, manually controlled means for operating said clutch means, and means including at least one propeller shaft, and a differential drivably connecting said drive shaft with said trailer wheels.

2. The improvement called for in claim 1 wherein said manually controlled means comprises a double-acting cylinder unit and valve control means therefor mounted in said crane.

References Cited in the file of this patent

UNITED STATES PATENTS

| 1,408,263 | Brun | Feb. 28, 1922 |
| 2,140,109 | Kellar | Dec. 13, 1938 |
| 2,157,376 | Zeilman | May 9, 1939 |
| 2,162,994 | Baker | June 20, 1939 |
| 2,674,333 | Zeilman et al. | Apr. 6, 1954 |